United States Patent
Endo et al.

(10) Patent No.: US 6,943,829 B2
(45) Date of Patent: Sep. 13, 2005

(54) IMAGING APPARATUS CONTROLLER AND CONTROL METHOD THEREOF, IMAGE PROCESSING APPARATUS AND METHOD THEREOF, AND PROGRAM CODE AND STORAGE MEDIUM

(75) Inventors: Takaaki Endo, Chiba (JP); Akihiro Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 975 days.

(21) Appl. No.: 09/818,606

(22) Filed: Mar. 28, 2001

(65) Prior Publication Data

US 2004/0201708 A1 Oct. 14, 2004

(30) Foreign Application Priority Data

Feb. 23, 2001 (JP) ........................................ 2001-048718

(51) Int. Cl.[7] ........................ H04N 5/225; H04N 5/232
(52) U.S. Cl. .............................. 348/207.11; 348/211.11
(58) Field of Search ........................ 348/207.11, 207.99, 348/211.1, 211.4, 211.11, 36, 38, 39, 47, 48, 207.1, 201.11, 218.1

(56) References Cited

U.S. PATENT DOCUMENTS

| 5,444,478 | A | * | 8/1995 | Lelong et al. | 348/39 |
| 5,657,073 | A | * | 8/1997 | Henley | 348/38 |
| 6,323,858 | B1 | * | 11/2001 | Gilbert et al. | 348/36 |
| 2001/0008421 | A1 | * | 7/2001 | Nishimura et al. | 348/231.9 |
| 2001/0019363 | A1 | * | 9/2001 | Katta et al. | 348/36 |
| 2003/0133008 | A1 | * | 7/2003 | Stephenson | 348/47 |

FOREIGN PATENT DOCUMENTS

| JP | 11-098342 | 4/1999 |
| JP | 11-242737 | 9/1999 |

* cited by examiner

Primary Examiner—Wendy R. Garber
Assistant Examiner—Luong T. Nguyen
(74) Attorney, Agent, or Firm—Fitzpatrick, Cella, Harper & Scinto

(57) ABSTRACT

Settings (sample settings) are obtained from each CCD camera. A PC calculates an average of the settings sent from all CCD cameras via a distributor. The calculated average is used as new settings for setting up all the CCD cameras again. And the obtained average is sent to each CCD camera through the distributor to set up each CCD camera again.

3 Claims, 8 Drawing Sheets

F I G. 2
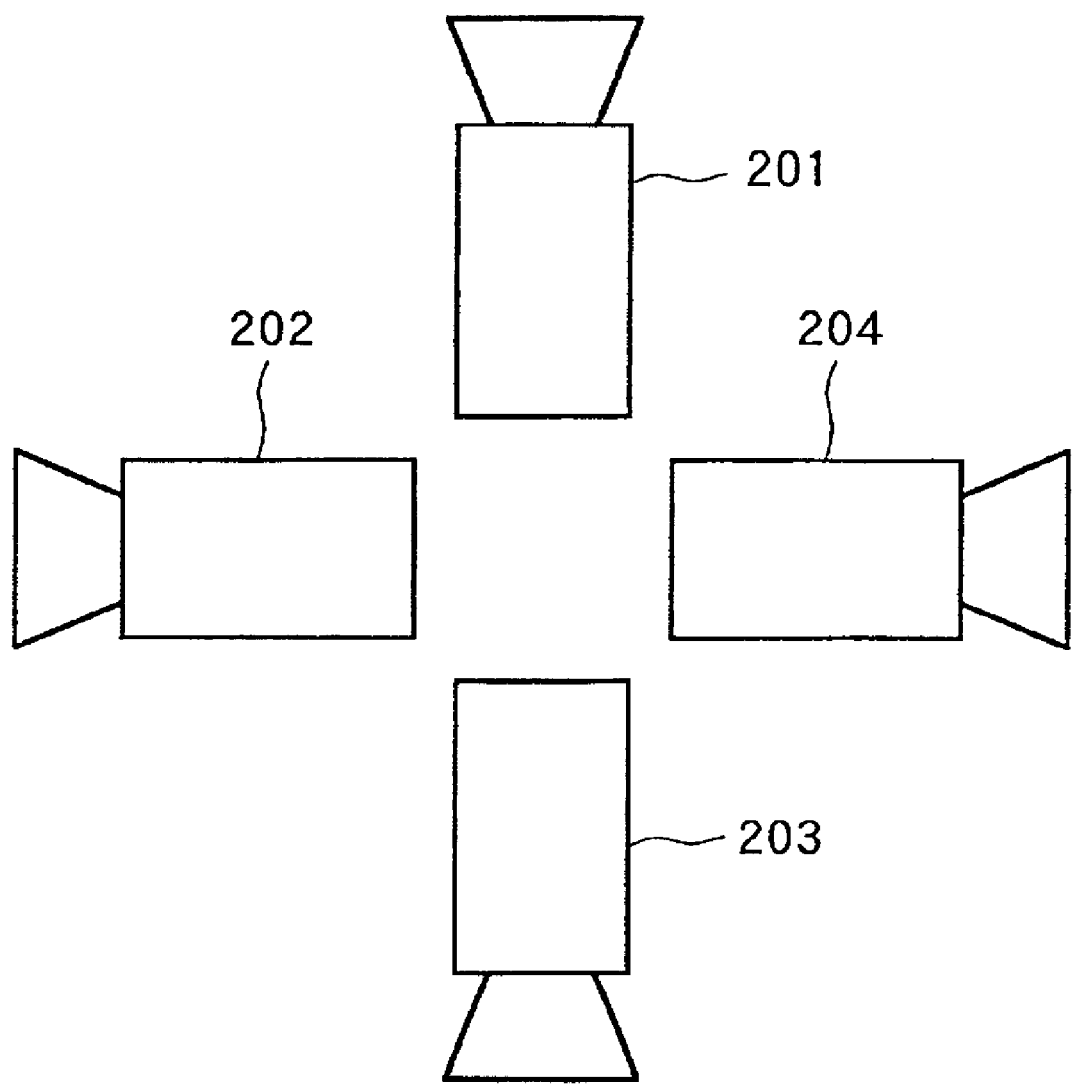

IMAGING APPARATUS CONTROLLER AND CONTROL METHOD THEREOF, IMAGE PROCESSING APPARATUS AND METHOD THEREOF, AND PROGRAM CODE AND STORAGE MEDIUM

FIELD OF THE INVENTION

The present invention relates to a controller and a control method for controlling the settings of a plurality of imaging apparatuses, an imaging processing apparatus and a method for processing an image, and a program code and a storage medium.

BACKGROUND OF THE INVENTION

Conventionally, a plurality of cameras were used to image a wide field of view. Each of the cameras was generally arranged to cover a desired field of view (for example, an omnidirectional field of view) with all the cameras. Images obtained from the respective cameras were temporarily stored in a storage device of a computer or the like.

The images taken by the respective cameras were stitched together to produce an image of the desired field of view.

However, in the prior art, when a sight in the outdoor environment is to be imaged with a plurality of cameras each of which is designed to automatically change the settings (shutter speed, focal length, diaphragm, or the like), the settings of each of these cameras will be automatically changed to different values because a portion of the sight that is to be imaged by each camera has a different brightness and focal length from those for the other cameras. Consequently, even if the images from the respective cameras are stitched together, the brightness and tint may become discontinuous at the seams of the images.

If the above-mentioned settings have fixed values, respectively, the resultant image may become blackish or whitish when the portions of the sight to be imaged by the respective cameras are remarkably different in brightness or the like from each other.

Therefore, the present invention has been made in light of the above-mentioned disadvantages and it is an object of the present invention to reduce any discontinuity between the images taken by a plurality of imaging apparatuses.

SUMMARY OF THE INVENTION

To attain the object of the present invention, an imaging apparatus controller according to the present invention has, for example, a configuration described below.

Namely, this is a controller for controlling the settings of a plurality of imaging apparatuses, which comprises detection means for detecting the imaging state of each of the above-mentioned imaging apparatuses, calculation means for calculating first settings of control parameters for each of the above-mentioned imaging apparatuses based on the detection result from the above-mentioned detection means, and set-up means for setting up each of the above-mentioned imaging apparatuses to the above-mentioned first settings calculated by the above-mentioned calculation means.

To attain the object of the present invention, an imaging apparatus controller according to the present invention has, for example, another configuration described below.

Namely, this is a controller for controlling the settings of a plurality of imaging apparatuses, which comprises image generation means for generating an image with an average luminance value from the respective images taken by the plurality of imaging apparatuses and means for determining the settings of the imaging apparatuses based on the image generated by the above-mentioned image generation means, wherein the plurality of imaging apparatuses are set up to the settings as determined above.

To attain the object of the present invention, an image processing apparatus according to the present invention has, for example, a configuration described below.

Namely, this is an image processing apparatus for processing an image, which comprises generation means for generating a transformation from the luminance value of images with overlapping portions to a predetermined luminance value and transformation means for performing the luminance value transformation generated by the above-mentioned generation means on the above-mentioned overlapping portions and for performing a transformation on non-overlapping portions by weighting the above-mentioned luminance value transformation.

Other features and advantages of the present invention will be apparent from the following description taken in conjunction with the accompanying drawings, in which like reference characters designate the same or similar parts throughout the drawings thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of a camera arrangement;

DETAILED DESCRIPTION OF THE PREFERRED EMBODIMENTS

Preferred embodiments of the present invention will now be described in detail in accordance with the accompanying drawings.

[First Embodiment]

Figure 1:
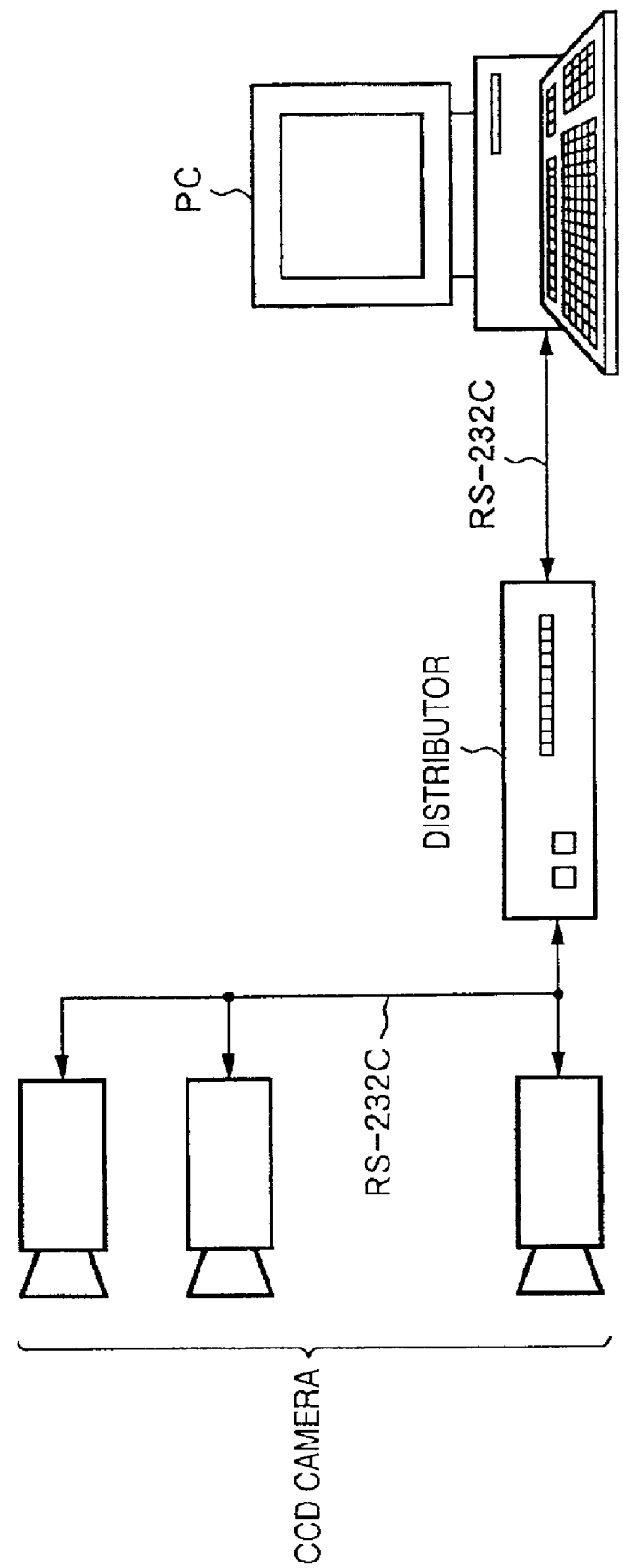
FIG. 1 shows a configuration of a system according to a first embodiment of the present invention.

FIG. 1 shows a configuration of a system according to this embodiment, which comprises CCD cameras serving as imaging apparatuses, a personal computer (PC) serving as a controller, and a distributor for controlling the switching among the plurality of CCD camera to send to and/or receive from the PC necessary data.

In the drawing, each CCD camera performs the imaging operation based on predetermined settings. The settings include camera parameters which a camera usually has, such as shutter speed, focal length, and diaphragm. According to this embodiment, these camera parameters can be changed automatically/manually and such automatic and manual operations can be switchable.

The cameras are arranged as illustrated in FIG. 2 to image the respective fields of view, which can cooperate to constitute omnidirectional field of view. In the drawing, reference numerals 201 to 204 denote CCD cameras.

It should be appreciated that a CCD camera is used as an imaging apparatus in this embodiment but the present invention is not limited to this embodiment and may use any imaging apparatus which can take moving-picture images and/or still-picture images. It should be also appreciated that omnidirectional field of view is to be imaged in this embodiment but the present invention is not limited to this embodiment and may image any desired field of view.

In FIG. 1, the distributor controls the switching to connect a CCD camera which is ready to send its settings to the PC when it is required to do so. Each of the CCD cameras is connected to the distributor through, for example, an RS-232C serial cable.

Figure 3:
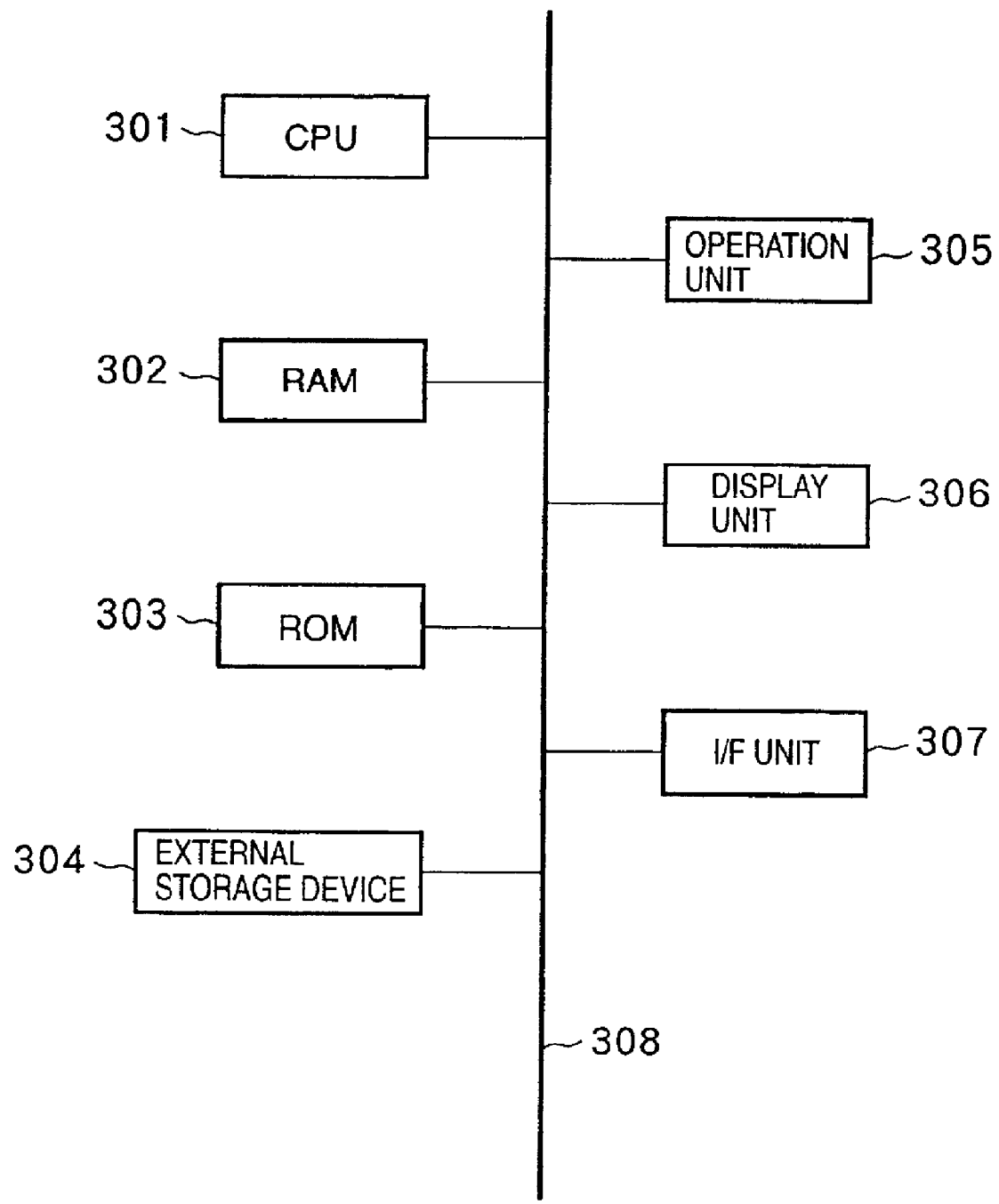
FIG. 3 shows a basic configuration of a PC.

The PC in FIG. 1 is an ordinary computer which has a basic configuration as shown in FIG. 3. Reference numeral 301 denotes a CPU, which reads out and executes program codes stored in a memory such as RAM 302 and ROM 303 to control the entire PC as well as to perform various processes described later.

Reference numeral 302 denotes a RAM, which has an area to temporarily store program codes and data loaded from an external storage device 304 and a work area to be used by the CPU 301 for performing the various processes.

Reference numeral 303 denotes a ROM, which stores program codes and data to control the entire PC as well as character codes.

Reference numeral 304 denotes an external storage device, which stores program codes and data installed from a storage medium such as a CD-ROM or floppy disk and provides an excess work area when the CPU 301 requires a work area in excess of the capacity of the RAM 302.

Reference numeral 305 denotes an operation unit, which is constituted by a mouse, a keyboard, and other pointing devices to enter various instructions into the PC.

Reference numeral 306 denotes a display unit, which is constituted by a CRT or a liquid crystal display so that various system messages can be displayed.

Reference numeral 307 denotes an I/F unit, which can be connected with a serial cable or the like and can be used as a network I/F. According to this embodiment, the PC is connected to the distributor via the I/F unit 307 through a serial cable having an RS-232C conformable protocol.

Reference numeral 308 denotes a bus connecting the above-mentioned components and units.

The operation for controlling the settings of all CCD cameras for imaging omnidirectional field of view by using the system according to this embodiment as shown in FIGS. 1 to 3 will be described below with reference to the flowchart shown in FIG. 4.

First, at step S401, each CCD camera is placed in automatic change mode. Then the settings of the CCD camera are automatically changed to optimal settings depending on an object in its imaging direction.

For example, when three CCD cameras are used to image in three directions (that is, a backlight direction, a shadow direction, and a direction with illumination of a color temperature other than the two other directions), these CCD cameras will be changed to have different settings, for example, of diaphragm and depth of field.

It should be appreciated that even during the changing operation, the settings of the CCD cameras are sent to the PC through the distributor in sequence. The PC stores the received settings of the CCD cameras in the RAM 302.

Next, at step S402, based on the settings of the CCD cameras sent to the PC, new settings are determined to perform a set-up operation for the CCD cameras again. It should be appreciated that according to this embodiment, the average is calculated from the settings sent from all the CCD cameras and this average is used as the new settings for all the CCD cameras.

When the settings of, for example, diaphragm and depth of field are sent from the CCD cameras, new settings for the CCD cameras (herein diaphragm X and depth of field Y) in the above-mentioned example (where the three CCD cameras are used to image in the three directions) are calculated by the following equations:

$$X=(X1+X2+X3)/3$$

$$Y=(Y1+Y2+Y3)/3$$

In the equations, x1, x2, and x3 denote the values of diaphragm sent from the CCD cameras and y1, y2, and y3 denote the values of depth of field sent from the CCD cameras.

Lastly, at step S403, an average determined by the PC is sent to the CCD cameras through the distributor in sequence to set up them again. It should be appreciated that each CCD camera must be in manual change mode to accept as its settings the values entered from outside. Then each CCD camera will be changed to have these settings.

Figure 5:
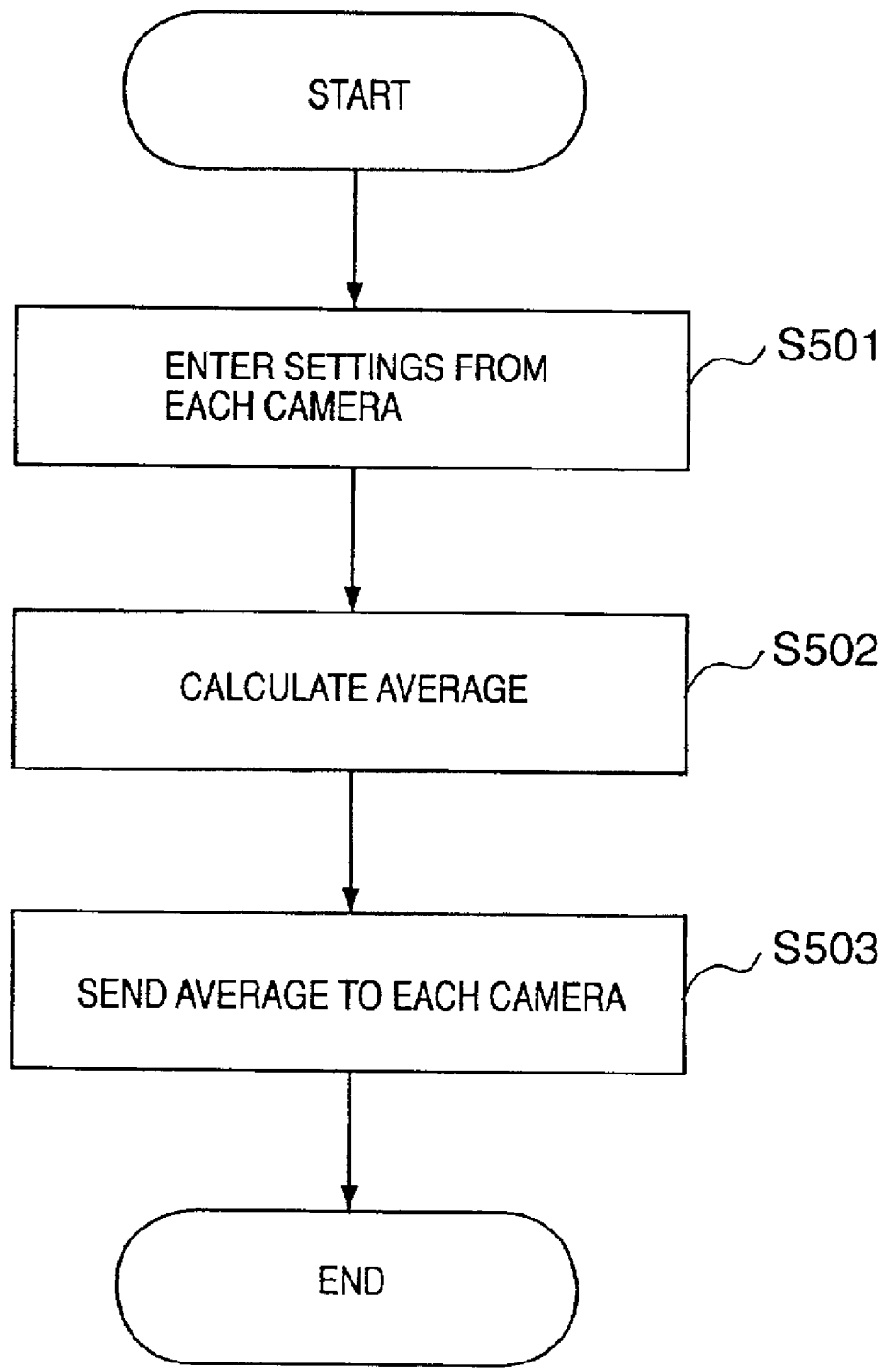
FIG. 5 is a flowchart for showing the process in the PC.

The operation performed by the PC in the above-mentioned process is shown in FIG. 5 and will be described below.

At step S501, the settings of each CCD camera are entered into the PC. At step S502, an average of the settings is calculated. At step S503, the calculated average is provided to all CCD cameras as new settings and is outputted to each CCD camera.

From the foregoing, the above-mentioned system including the imaging apparatuses and the controller according to this embodiment can reduce any discontinuity in tint and brightness at the seams of images even when omnidirectional field of view is created from the images taken by the CCD cameras.

[Second Embodiment]

In the first embodiment, the sample settings are obtained by placing each CCD camera in automatic change mode. However, the present invention is not limited to this embodiment and alternatively, a sensor to measure the brightness of an object or the distance to the object may be provided in proximity to each CCD camera. New settings of each CCD camera can be determined in a similar manner to the first embodiment by connecting the sensor to the distributor.

When the new settings of each CCD camera are determined, they are sent to the CCD camera via the distributor. Consequently, the CCD camera can be set up to the new settings in a similar manner to the first embodiment.

Figure 4:
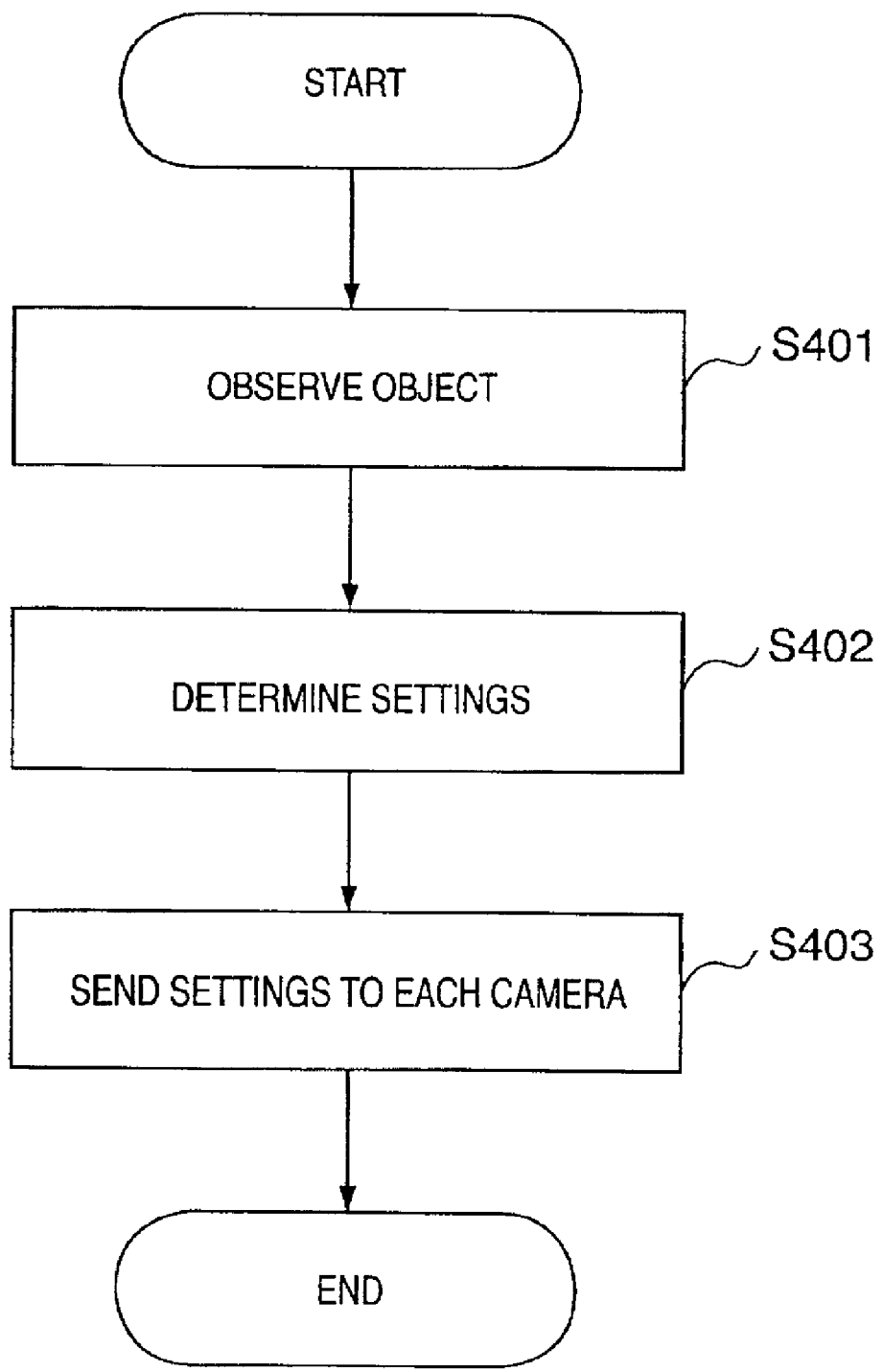
FIG. 4 is a flowchart for showing a process in the system.

It should be appreciated that this operation of the system can be represented in the flowchart of FIG. 4 except that the brightness of an object or the distance to the object is measured by each sensor at step S401 and the settings of each CCD camera are determined from the measurements at step S402.

It should be also appreciated that the operation of the PC can be represented in the flowchart of FIG. 5 except that the measurements obtained by the sensor are entered at step S501 and the settings of each CCD camera are determined from the measurements at step S502.

[Third Embodiment]

In the first embodiment, an average of the settings entered from all the CCD cameras is used to determine new settings of them. However, the present invention is not limited to this embodiment and alternatively, for example, a representative CCD camera may be selected and its settings may be provided to other CCD cameras.

It should be appreciated that this operation of the system can be represented in the flowchart of FIG. 4 except that an object is observed by the representative CCD camera to determine its settings at step S401 and the determined settings are sent to other CCD cameras as new settings.

It should be also appreciated that the operation of the PC can be represented in the flowchart of FIG. 5 except that the settings are entered from the representative CCD camera at step S501 and the settings of the representative CCD camera are provided to the other CCD cameras at step S503 without performing the operation of step S502 in FIG. 5.

It should be further appreciated that a representative CCD camera may be selected by entering the settings of all the CCD cameras and determining which CCD camera has average settings.

Alternatively, all the cameras may not have the same settings. Namely, optimal settings are first determined for each camera (the operation of step S401 according to the first embodiment is performed). Then calculation is made so that a difference in settings between the adjacent cameras may not be large and the settings of both cameras are "gradually" adjusted and set up. In this way, an image will be taken by each CCD camera based on the optimally adjusted settings and any discontinuity due to a difference in brightness of the images can be reduced.

An example of the operation for "gradually" adjusting and setting up the settings of each CCD camera will be described now. For example, the settings of every other CCD camera are sampled to plot a free-form curve such as a spline curve by using the sampled points. The settings of the other CCD cameras which are not sampled are compensated to be on the free-form curve. It should be appreciated that the operation for "gradually" adjusting the settings is performed by the PC.

It should be appreciated that this operation of the system can be represented in the flowchart of FIG. 4 except that the compensation is performed at step S402. Similarly, it should be also appreciated that the operation of the PC can be represented in the flowchart of FIG. 5 except that the compensation is performed at step S502.

Alternatively, an image taken by each CCD camera is entered into the PC to create an image with an average luminance value (average luminance image) from a plurality of images taken at the PC. The average luminance image is provided to one of the CCD cameras (another CCD camera may be connected to the PC for this purpose) to determine the settings of the CCD camera with respect to the average luminance image. The determined settings are provided to the other CCD cameras through the PC and the distributor to set up the CCD cameras.

Alternatively, any discontinuity in tint or brightness among images taken by the CCD cameras may be reduced by performing an image processing operation on each of the images. Two examples will be described below.

As a first example, an error (herein a difference in luminance) of an overlapping portion between adjacent images (one overlapping portion located on either side of an image of interest) is determined for every overlapping portion (that is, all overlapping portions between images). Then a luminance value transformation is determined to minimize the sum of errors (for example, through a least square method). This transformation may vary among the overlapping portions but the sum of errors on the whole overlapping portions can be minimized by performing a different transformation for each overlapping portion.

Figure 6:
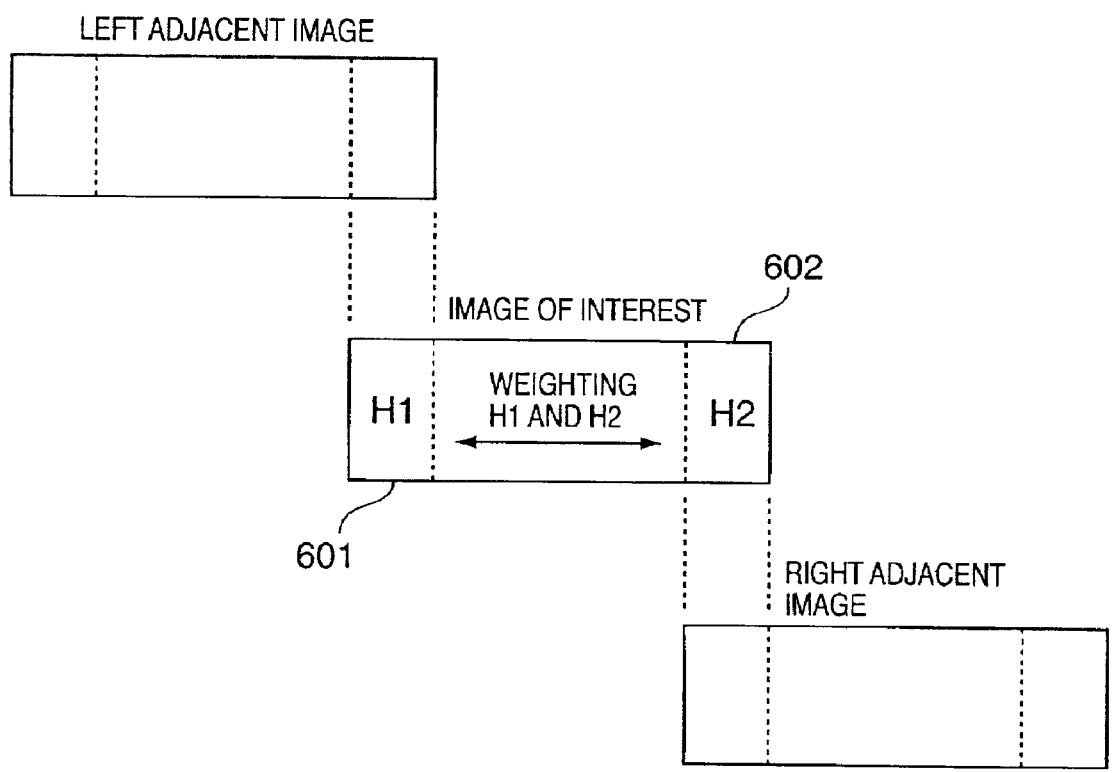
FIG. 6 explains a transformation performed on an image of interest.

As a second example, as shown in FIG. 6, a transformation (hereinafter referred to as H1) is defined such that an overlapping portion 601 between an image of interest and the left adjacent image has, on average, the same luminance value (as those of the image of interest and the left adjacent image) and another transformation (hereinafter referred to as H2) is defined such that an overlapping portion 602 between the image of interest and the right adjacent image has, on average, the same luminance value (as those of the image of interest and the right adjacent image).

Figure 7:
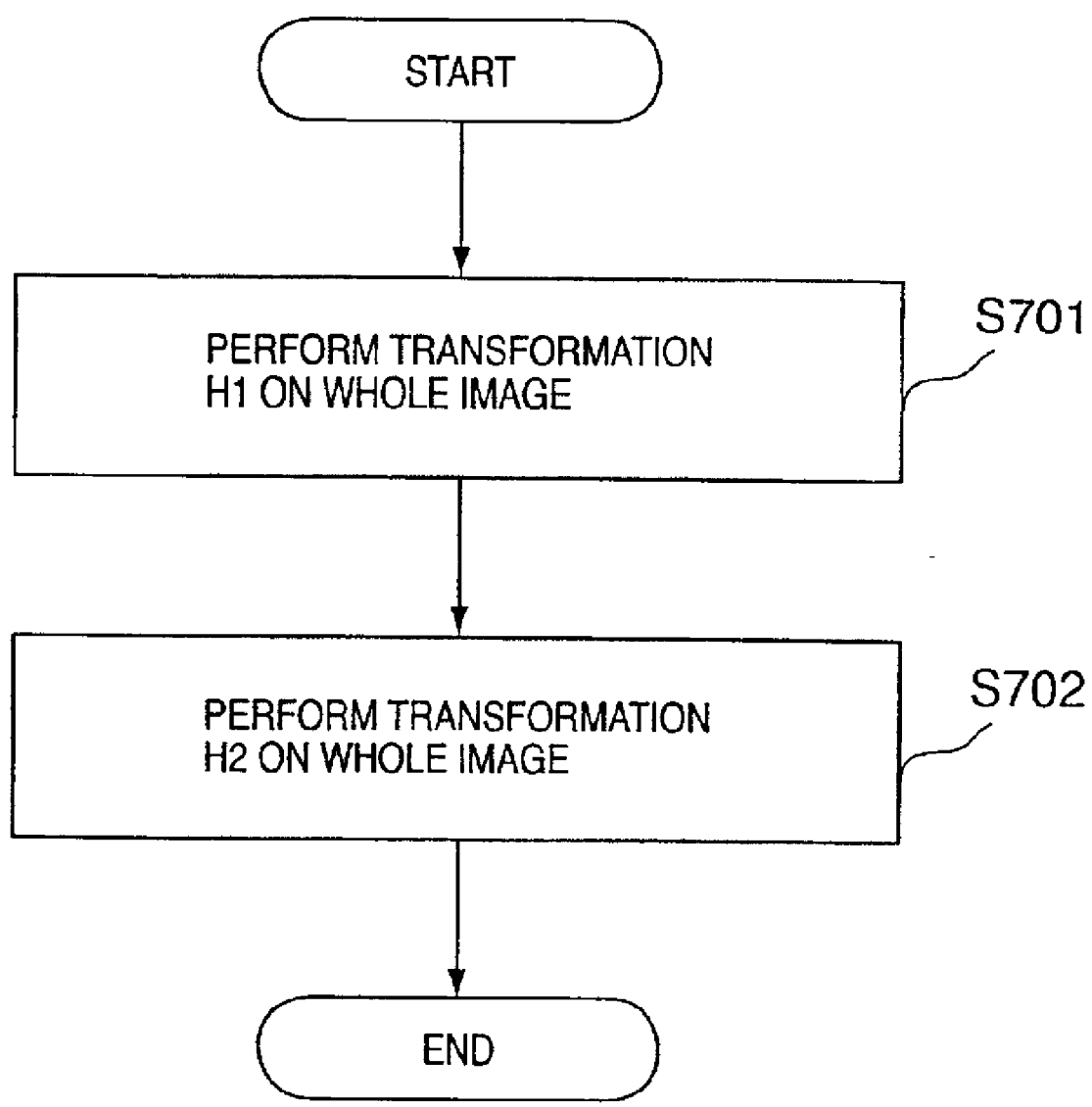
FIG. 7 is a flowchart for showing a prior process of reducing any discontinuity between adjacent images.

Conventionally, these transformations H1 and H2 were performed on the whole image of interest (either transformation may be performed first). As a result, the image of interest would be transformed twice to produce some discontinuity between the overlapping portions 601 and 602 and the adjacent images. The flowchart for this process is shown in FIG. 7. As described above, the transformation H1 is first performed on the whole image of interest (step S701) and then the transformation H2 is performed on the whole image of interest (step S702).

According to this embodiment, the transformations H1 and H2 are performed on the overlapping portions 601 and 602 between the image of interest and the left and right adjacent images, respectively. As a result, the overlapping portion 601 between the image of interest and the left adjacent image will have an average luminance value obtained from these images. Also, the overlapping portion 602 between the image of interest and the right adjacent image will have an average luminance value obtained from these images.

Still another transformation obtained by weighting the transformations H1 and H2 is performed on the non-overlapping portion in the image of interest. This transformation called as H3 is expressed as the following equation.

$H3 = \alpha \times H1 + (1-\alpha) \times H2$ (where $0 < \alpha < 1$)

This process can reduce any discontinuity in the non-overlapping portion.

Figure 8:
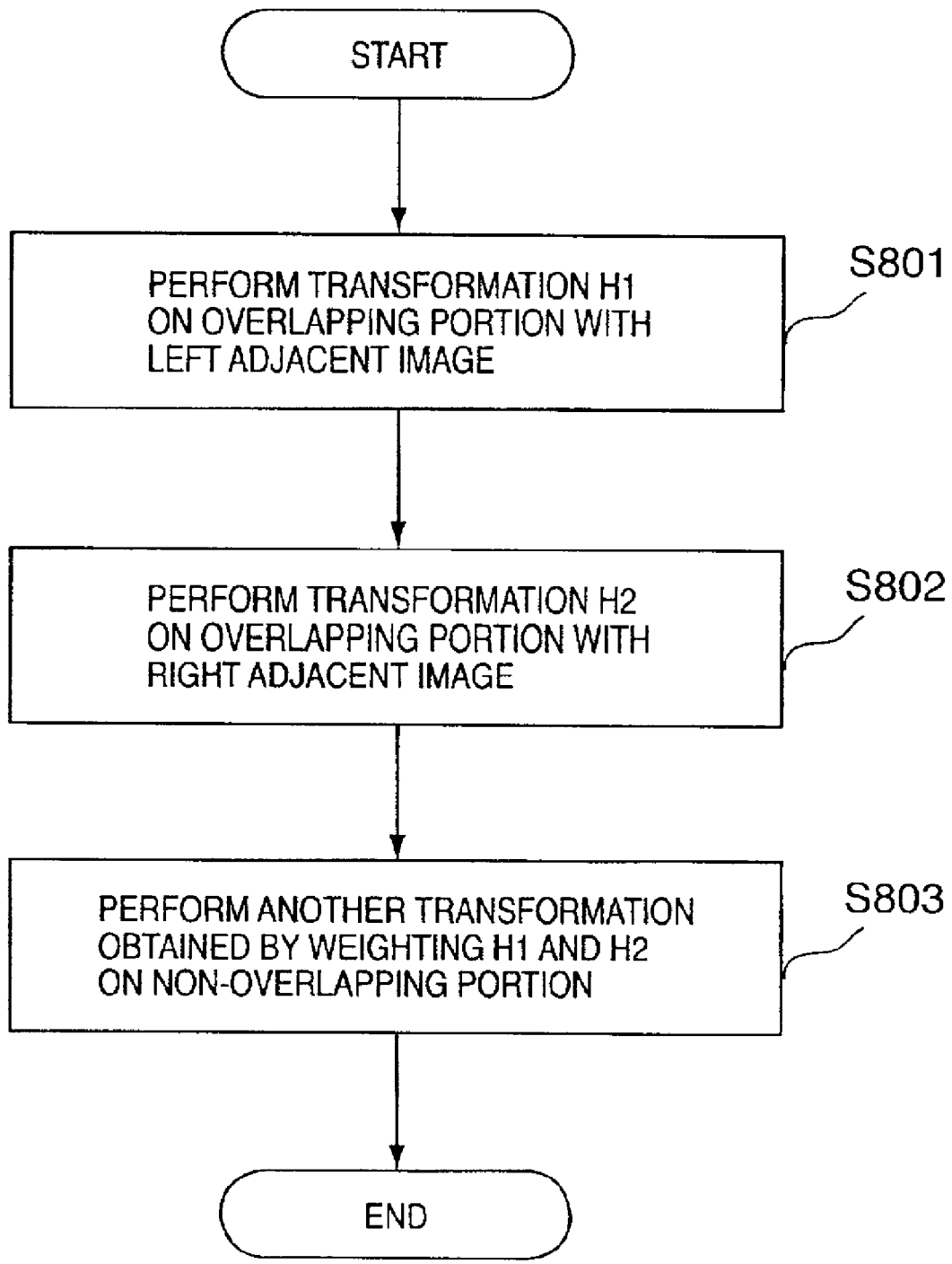
FIG. 8 is a flowchart for showing a process of reducing any discontinuity between adjacent images according to a third embodiment of the present invention.

The flowchart for this process is shown in FIG. 8. As described above, the transformation H1 is performed on the portion 601 (step S801), the transformation H2 is performed on the portion 602 (step S802), and another transformation which is obtained by weighting the transformations H1 and H2, for example, the transformation H3 described above is performed on the non-overlapping portion. It should be appreciated that the operations of steps S801, S802, and S803 may not be performed in this order.

[Fourth Embodiment]

In the above-mentioned embodiments, the sample settings are obtained from all the CCD cameras. However, the present invention is not limited to these embodiments and alternatively, for example, a camera with a fish-eye lens may be used to cover the fields of view of all the cameras. When such a camera is used to take an image, the resultant image will cover the whole field of view of that camera. Thus, the taken image may be used to create, for example, a histogram of brightness to calculate the settings (sample settings) depending on the average brightness.

The calculated settings are provided to all the CCD cameras in a similar manner to the above-mentioned embodiments.

It should be appreciated that the system according to this embodiment has a configuration wherein a single CCD camera with a fish-eye lens is connected to the PC not through any distributor, but through a serial cable in FIG. 1. It should be also appreciated that the operation for creating a histogram and the operation for calculating the sample settings from the created histogram are performed by the PC.

It should be further appreciated that the second, third, and fourth embodiments may be applied to moving-picture images.

Note that the present invention may be applied to either a system constituted by a plurality of devices (e.g., a host computer, an interface device, a reader, a printer, or the like), or an apparatus consisting of a single equipment (e.g. a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

The present invention includes a product, e.g., a printout, obtained by the image processing method of the present invention.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts (FIG. 4 and/or FIG. 5) described in the embodiments.

As many apparently widely different embodiments of the present invention can be made without departing from the spirit and scope thereof, it is to be understood that the invention is not limited to the specific embodiments thereof except as defined in the appended claims.

What is claimed is:

1. A controller for controlling settings of a plurality of imaging apparatuses, comprising:
   detection means for detecting an imaging state of each of said imaging apparatuses;
   calculation means for calculating first settings of control parameters for each of said imaging apparatuses based on a detection result from said detection means; and
   set-up means for setting up each of said imaging apparatuses to said first settings calculated by said calculation means,
   wherein said detection result is second settings properly adjusted to each of said imaging apparatuses, and
   wherein said calculation means calculates first settings for an imaging apparatus of interest depending on a difference in second settings between said imaging apparatus of interest and an imaging apparatus adjacent to said imaging apparatus of interest.

2. A controller for controlling settings of a plurality of imaging apparatuses, comprising:
   detection means for detecting an imaging state of each of said imaging apparatuses;
   calculation means for calculating first settings of control parameters for each of said imaging apparatuses based on a detection result from said detection means; and
   set-up means for setting up each of said imaging apparatuses to said first settings calculated by said calculation means,
   wherein said detection result is obtained from a sensor provided in proximity to each of said imaging apparatuses and said detection result is used as second settings for each of said imaging apparatuses, and
   wherein said calculation means calculates first settings for an imaging apparatus of interest depending on a difference in second settings between said imaging apparatus of interest and an imaging apparatus adjacent to said imaging apparatus of interest.

3. A controller for controlling settings of a plurality of imaging apparatuses, comprising:
   detection means for detecting an imaging state of each of said imaging apparatuses;
   calculation means for calculating first settings of control parameters for each of said imaging apparatuses based on a detection result from said detection means; and
   set-up means for setting up each of said imaging apparatuses to said first settings calculated by said calculation means,
   wherein said detection result is a distribution of brightness calculated from an imaging taken by an imaging apparatus which is capable of imaging a wider field view and said detection result is used as second settings for each of said imaging apparatuses based on said distribution, and
   wherein said calculation means calculates first settings for an imaging apparatus of interest depending on a difference in second settings between said imaging apparatus of interest and an imaging apparatus adjacent to said imaging apparatus of interest.

* * * * *